US012253117B1

(12) United States Patent
Bernardo Sosa (10) Patent No.: US 12,253,117 B1
(45) Date of Patent: Mar. 18, 2025

(54) OIL REDIRECTOR FOR COOLING SEMI-DRY CLUTCHES

(71) Applicant: Schaeffler Technologies AG & Co. KG, Herzogenaurach (DE)

(72) Inventor: Juan Bernardo Sosa, Huejotzingo (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/471,526

(22) Filed: Sep. 21, 2023

(51) Int. Cl.
*F16D 25/12* (2006.01)
*F16D 25/0638* (2006.01)

(52) U.S. Cl.
CPC ....... *F16D 25/123* (2013.01); *F16D 25/0638* (2013.01)

(58) Field of Classification Search
CPC ............................ F16D 25/0638; F16D 25/123
See application file for complete search history.

(56) References Cited

U.S. PATENT DOCUMENTS

| 11,421,768 B1* | 8/2022 | Flores | F16H 45/02 |
| 2012/0193186 A1* | 8/2012 | Frait | F16D 25/12 |
| | | | 192/85.01 |
| 2016/0061275 A1* | 3/2016 | Arhab | F16D 25/0638 |
| | | | 192/48.603 |

FOREIGN PATENT DOCUMENTS

DE 102018009583 A1 * 6/2020
DE 102022106436 A1 * 10/2022

* cited by examiner

*Primary Examiner* — James J Taylor, II
(74) *Attorney, Agent, or Firm* — Volpe Koenig (57) ABSTRACT

An oil redirector duct arrangement for a clutch assembly. The oil redirector directs transmission fluid from a radially inner fluid inlet to a radially outer region including clutch plates of a clutch pack. This increases oil flow to the clutch pack to provide proper functioning and durability of the clutch over a wider range of conditions than assemblies that do not include such oil redirector duct configuration. The oil redirector can be implemented in existing transmission assemblies without a change in size or form factor.

16 Claims, 9 Drawing Sheets

OIL REDIRECTOR FOR COOLING SEMI-DRY CLUTCHES

TECHNICAL FIELD

The present disclosure relates to power transmission devices and, more particularly, power transmission devices semi-dry clutches.

BACKGROUND

Mechanical power transmission devices including clutch assemblies are well known. The clutch assembly is typically a main heat source inside such mechanical power transmission devices. The clutch assembly generates heat as a result of friction between the clutch plates during engagement and disengagement of the clutch. Accordingly, cooling of the power transmission device, including the clutch assembly, can be important to assist in proper functioning and improve durability. For fully immersed (wet) clutch configurations, transmission fluid (oil) is circulated around the clutch assembly to assist in proper cooling. For semi-dry clutch configurations (clutch is not fully immersed in transmission fluid), proper cooling can be difficult under some conditions. For example, the transmission fluid may not be equally circulated around the clutch and/or may not be of a sufficient volume and flow rate to avoid excessive temperatures.

SUMMARY

Certain clutch types used in, for example, hybrid systems having a torque converter and an electric motor, unlike conventional torque converter clutches, are not fully immersed in transmission fluid which as noted can make ensuring proper cooling difficult. The present disclosure sets forth an oil redirector duct configuration for directing transmission fluid to the clutch plates. This may increase oil flow to the clutch to provide proper functioning and durability of the clutch over a wider range of conditions than assemblies that do not include such oil redirector duct configuration. The oil redirector duct configuration can be implemented in existing transmission assemblies without a change in size or form factor.

In accordance with one aspect of the present disclosure, a clutch assembly comprises a clutch pack, a piston for selectively applying pressure to the clutch pack, a sealing plate, and an oil redirector. The oil redirector and the sealing plate each define portions of a plurality of circumferentially spaced-apart and radially extending ducts for directing transmission fluid from a radially inner transmission fluid inlet to the clutch pack.

The oil redirector can comprise a plurality of circumferentially spaced-apart channels surrounding a central opening. The channels can define first surfaces of the plurality of ducts and the sealing plate can define second surfaces of the plurality of ducts, the first surfaces and second surfaces defining flow paths. The channels can have a rectangular cross-sectional shape. The oil redirector can be laser welded to the sealing plate. The oil redirector can comprise a stamped sheet of metal. The redirector plate can comprise a plurality of circumferentially-spaced sidewalls extending tangentially relative to a center opening of the redirector plate, the sidewalls extending between respective adjacent pairs of the plurality ducts. Each of the sidewalls can be comprised of two sidewall sections, each sidewall section extending in a respective non-parallel plane, and an angle θ between the respective planes is greater than zero. The oil redirector can be comprised of a plurality of discrete components secured to the sealing plate, each discrete component defining at least a portion of at least one duct. The clutch pack can be a semi-dry clutch pack.

In accordance with another aspect of the present disclosure, an oil redirector for a clutch assembly comprises a first redirector half, and a second redirector half joined to the first redirector half. The first redirector half and the second redirector half each define portions of a plurality of circumferentially spaced-apart and radially extending ducts for directing transmission fluid from a radially inner transmission fluid inlet to a radially outer region of the clutch assembly.

At least one of the first redirector half or second redirector half can include a plurality of circumferentially spaced-apart channels surrounding a center opening. The channels can have a rectangular cross-sectional shape. The first redirector half can be laser welded to the second redirector half. At least one of the first redirector half or second redirector half can comprise a stamped sheet of metal. At least one of the first redirector half or second redirector half can comprise a plurality of circumferentially-spaced sidewalls extending tangentially relative to a center opening of the oil redirector, the sidewalls extending between respective adjacent pairs of the plurality ducts. Each of the sidewalls can be comprised of two sidewall sections, each sidewall section extending in a respective non-parallel plane, and an angle θ between the respective planes is greater than zero.

In accordance with another aspect of the present disclosure, a method of supplying non-pressurized transmission fluid to a semi-dry clutch pack of a clutch assembly comprises forming a plurality of circumferentially spaced-apart and radially extending ducts for directing transmission fluid from a radially inner transmission fluid inlet to the clutch pack. Forming the plurality of ducts includes securing an oil redirector to a sealing plate of the clutch assembly.

Securing the oil redirector to the sealing plate can include laser welding the oil redirector to the sealing plate. The oil redirector can comprise a stamped sheet of metal.

BRIEF DESCRIPTION OF THE DRAWING(S)

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENT(S)

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
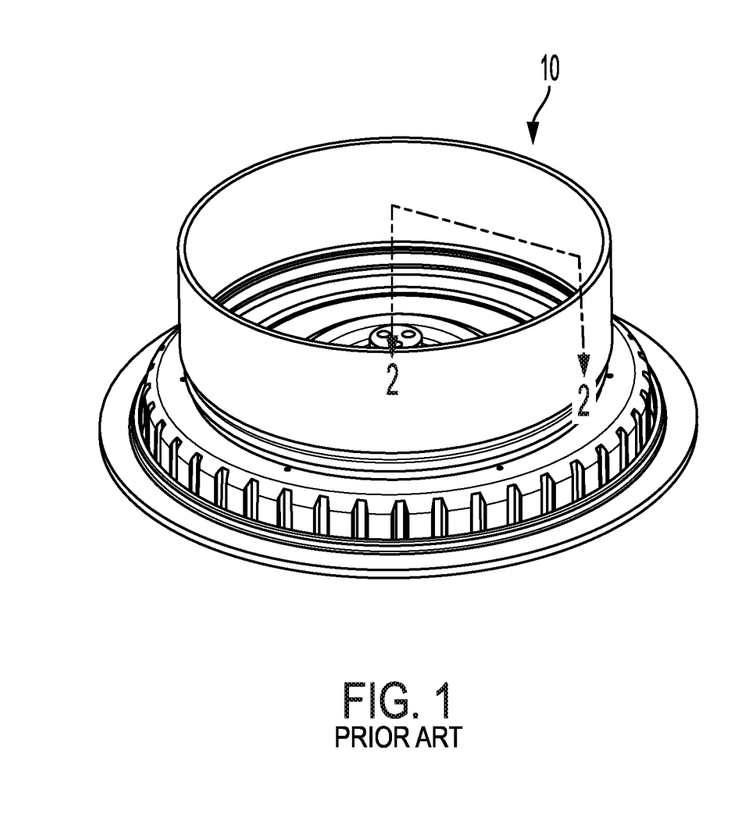
FIG. 1 is a perspective view of a prior art clutch assembly.
Figure 2:
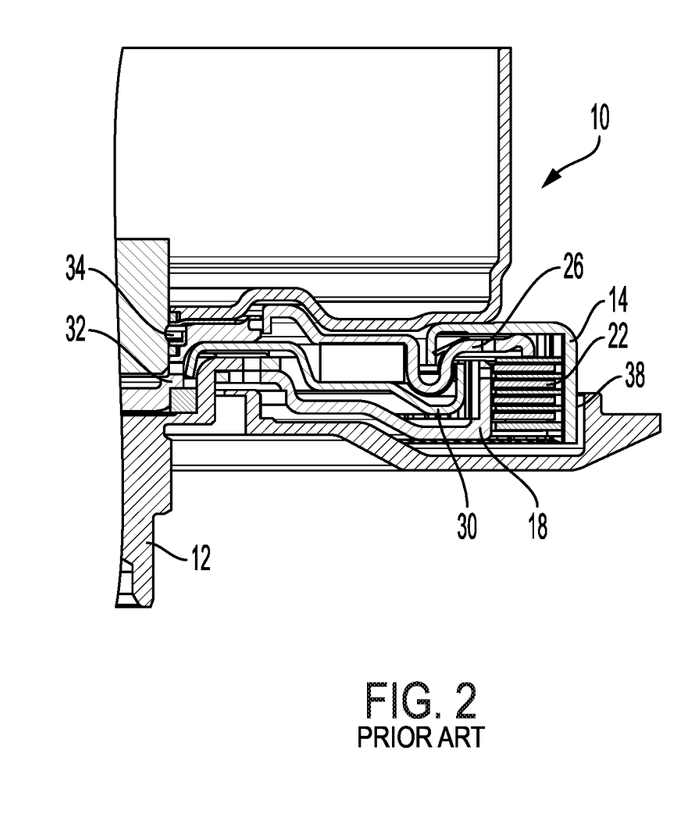
FIG. 2 is a cross-sectional view taken along the line 2-2 in FIG. 1.

In FIGS. 1 and 2, a conventional clutch assembly is illustrated and identified generally by reference numeral 10. The clutch assembly 10 generally includes a number of components such as a shaft 12, an outer carrier 14, an inner carrier 18, a clutch pack 22, a piston 26 for applying pressure to the clutch pack 22, a sealing plate 30, and a hub 32. When the piston 26 applies pressure to the clutch pack 22, the shaft 12 and hub 32 are coupled together to transmit torque.

As noted above, the clutch pack 22 of the clutch assembly 10 is not fully immersed in transmission fluid. Transmission fluid is injected to the system at an inlet 34 and migrates radially outwardly to an outlet 38. It has been found that such fluid in the conventional clutch 10 may migrate to the outlet 38 in a nonuniform manner and thereby may bypass at least portions of the clutch pack 22.

Figure 3:
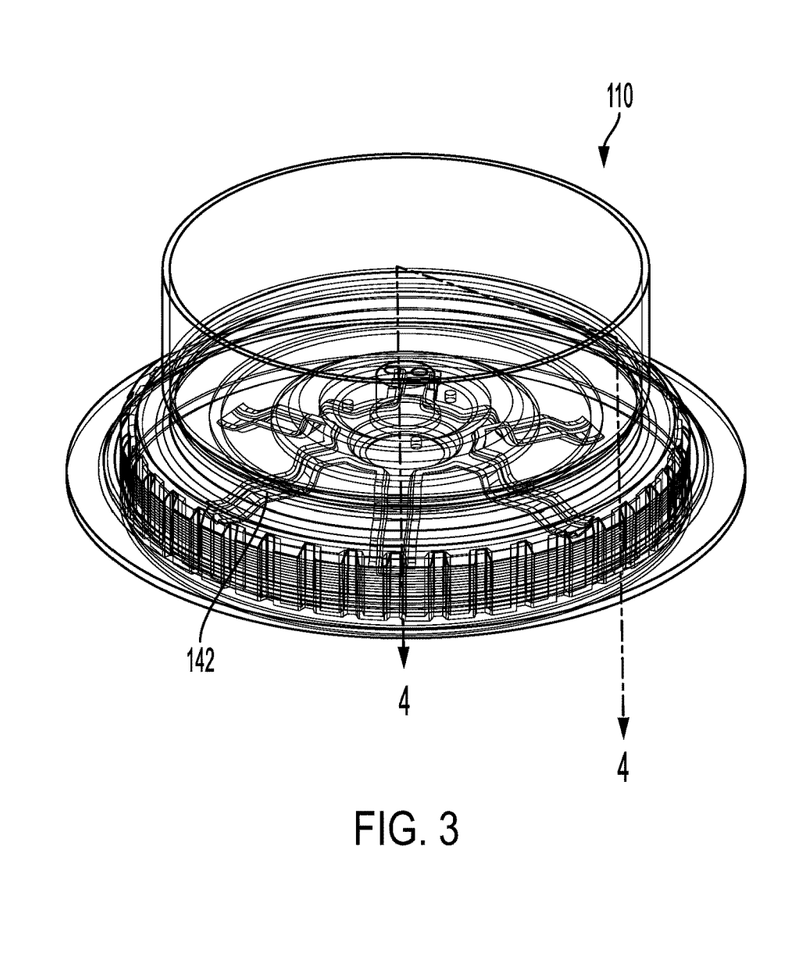
FIG. 3 is a perspective view of an exemplary clutch assembly including an oil redirector in accordance with the present disclosure.
Figure 4:
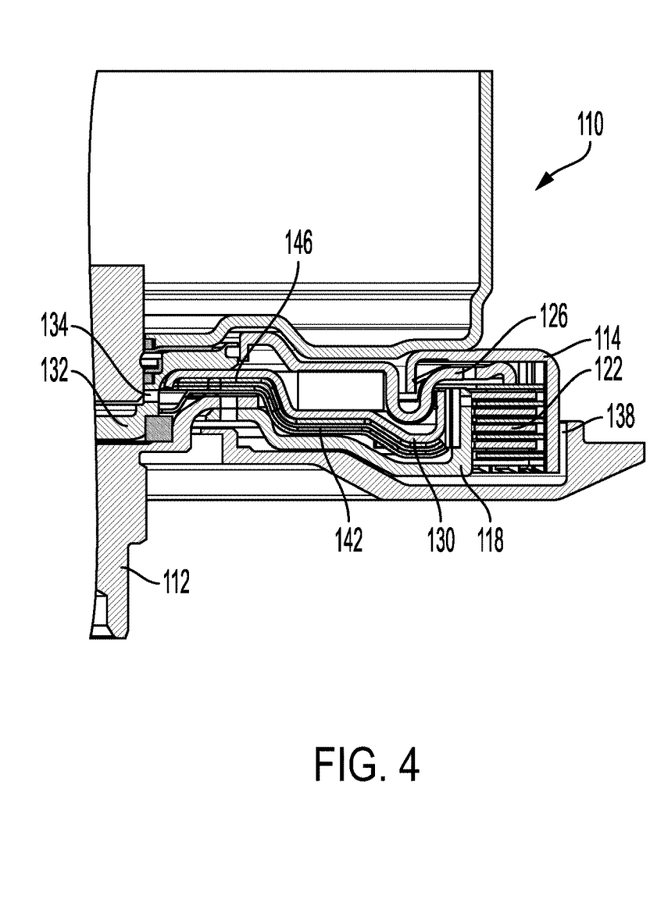
FIG. 4 is a cross-sectional view taken along the line 4-4 in FIG. 3.

Turning to FIGS. 3 and 4, a clutch assembly in accordance with present disclosure is illustrated and identified generally by reference numeral 110. The clutch assembly 110 generally includes a number of components such as a shaft 112, an outer carrier 114, an inner carrier 118, a clutch pack 122, a piston 126 for applying pressure to the clutch pack 122, a sealing plate 130, and a hub 132.

Transmission fluid is injected to the system at an inlet 134 and migrates radially outwardly to an outlet 138. Like the clutch pack 22 of the clutch assembly 10, clutch pack 122 also is not fully immersed in transmission fluid. However, the clutch assembly 110 includes a redirector plate 142 that forms a plurality of circumferentially spaced-apart radially extending ducts 146 to route transmission fluid to the clutch pack 122. The ducts 146 provide direct radial paths for the transmission fluid to flow to and around the clutch pack 122 to increase a likelihood of proper cooling of the clutch pack 122 under a wider range of conditions.

Figure 5:
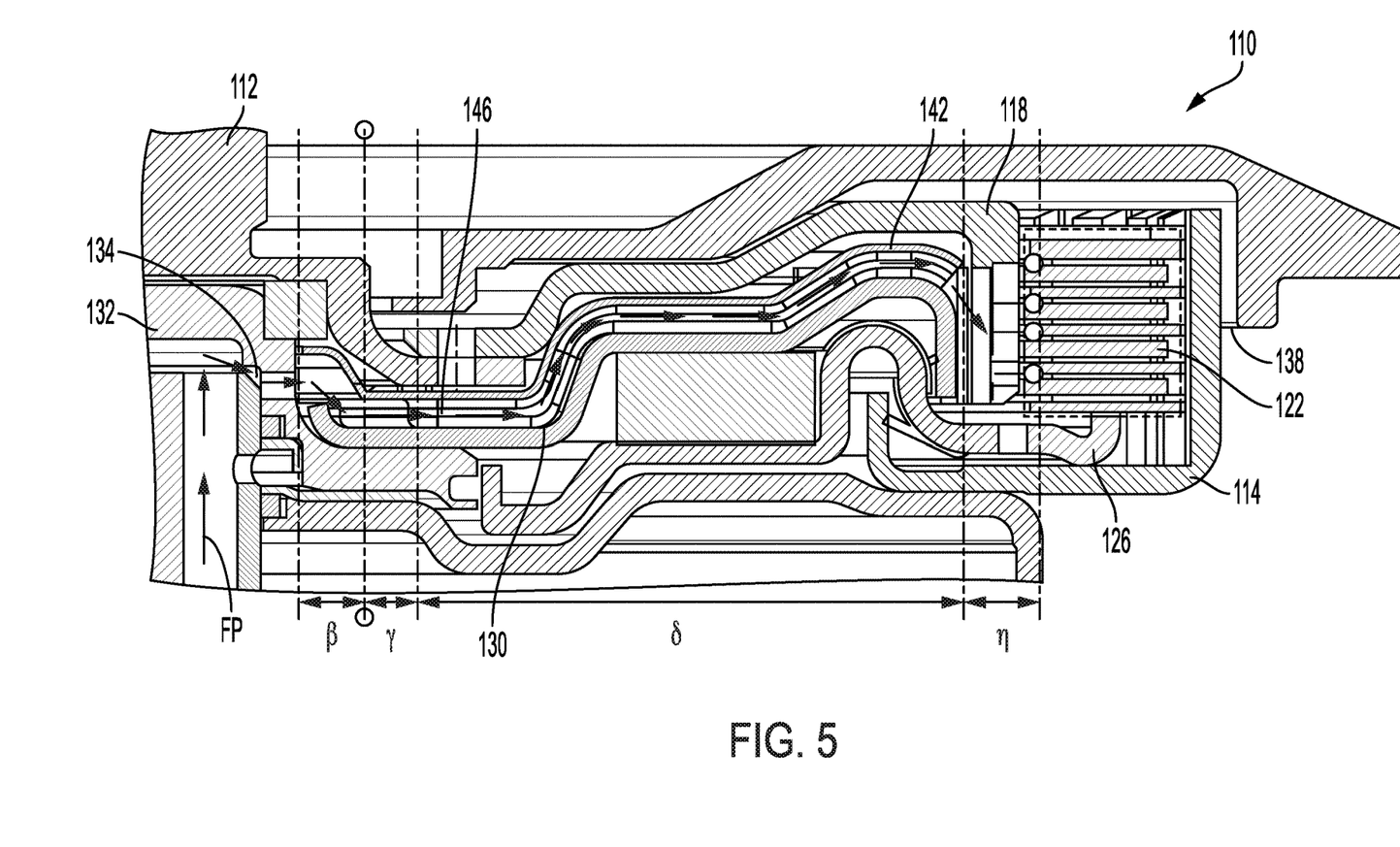
FIG. 5 is an enlarged cross-sectional view of the exemplary clutch of FIG. 3 illustrating zones of the oil redirector.
Figure 6:
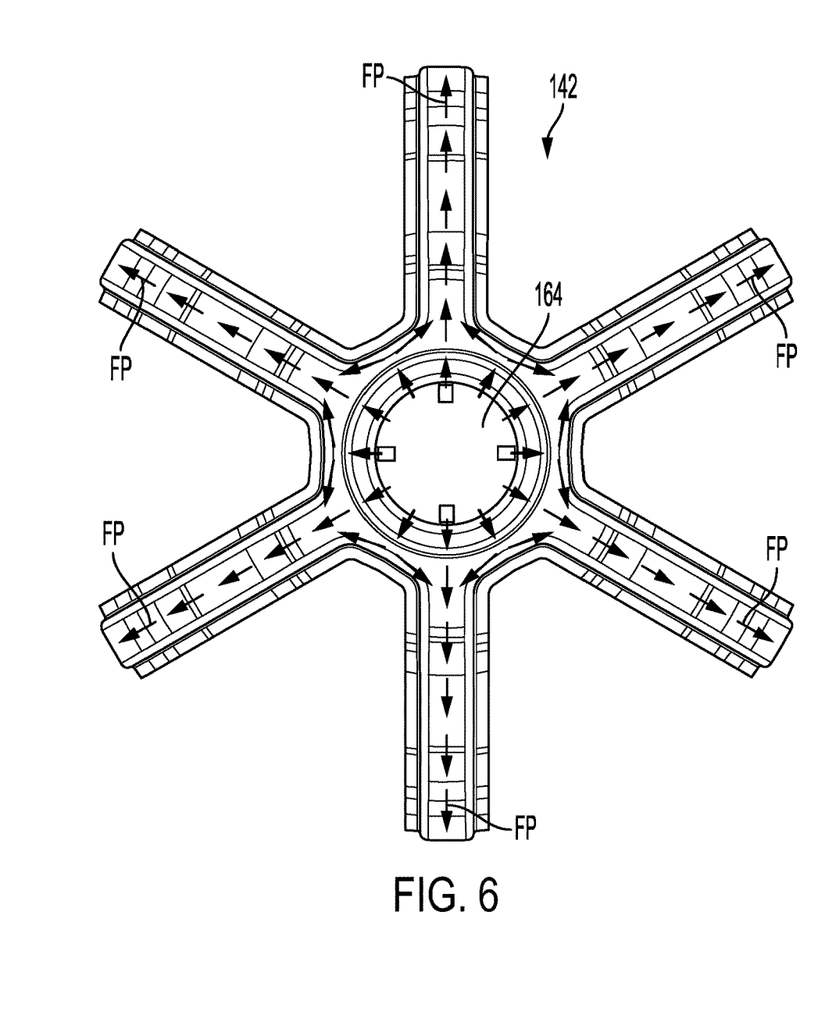
FIG. 6 is a plan view of the oil redirector showing oil flow paths.
Figure 7:
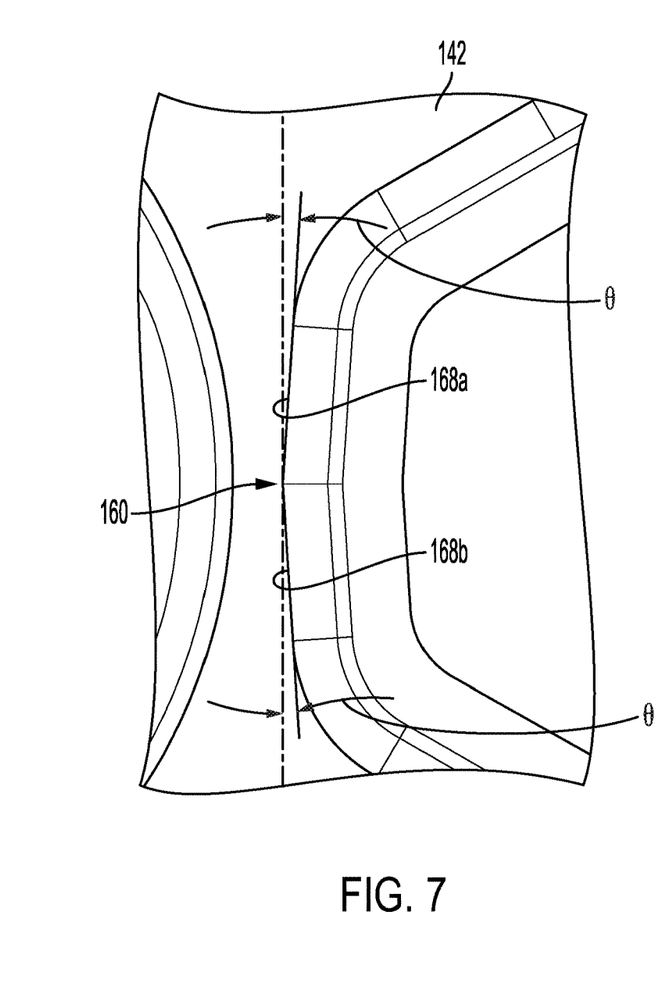
FIG. 7 is an enlarged portion of FIG. 6.
Figure 8:
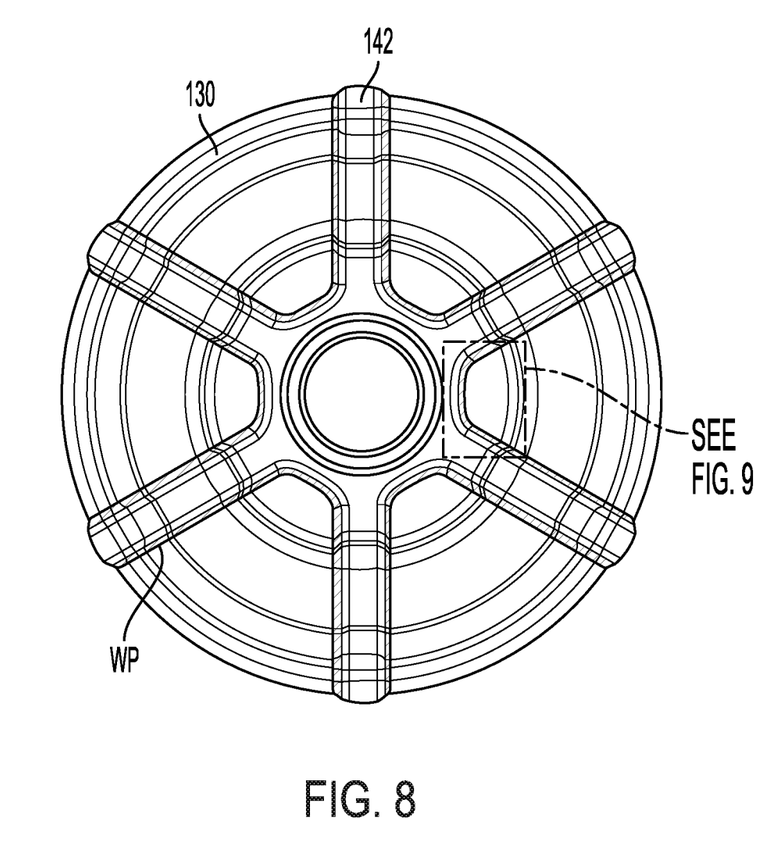
FIG. 8 a plan view of the oil redirector showing weld paths.
Figure 9:
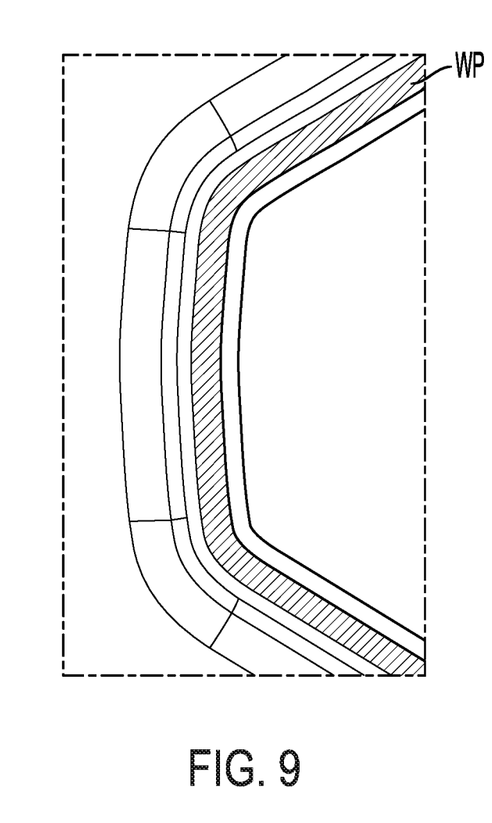
FIG. 9 is an enlarged portion of FIG. 8.

With reference to FIGS. 5 and 6, flow paths FP through the ducts 146 are shown. It will be appreciated that the flow paths FP defined by the ducts 146 more directly supply transmission fluid from the inlet 134 to the clutch pack 122 and, ultimately, to the outlet 138. This may result in increased transmission fluid flow to the clutch pack 122 and, consequently, increased cooling of the clutch pack 122. In the illustrated embodiment, six radially extending ducts 146 are shown. However, any number of ducts 146 can be provided. In the exemplary embodiment of FIGS. 2-6, surfaces of the redirector plate 142, together with surfaces of the sealing plate 130, define each duct 146.

FIGS. 5 and 6 also show zones of the ducts 146. A first radially inner zone includes a recollection zone B which is immediately after the inlet 134, followed by a funnel zone y which redirects the transmission fluid that comes from the B zone periphery. Then the transmission fluid is directed radially outwardly to the o arms and finally to the distribution zone n which releases the transmission fluid to the inner carrier 118 that supplies it to the clutch pack 122.

With additional reference to FIGS. 7-12, it should be appreciated that the redirector plate 142 can comprise stamped sheet metal of 0.8 mm thickness, for example, joined to the sealing plate 130 by laser welding. Other material thicknesses and manufacturing process can be utilized without departing from the scope of the present disclosure. Since the ducts 146 are configured to redirect a non-pressurized flow of transmission fluid, the strength and/or continuity of the laser weld path WP (see FIGS. 8 and 9) is not as critical as would be required for redirecting a pressurized flow. Due to the low pressure conditions, it is possible to adjust the stamping profiles to achieve desired stack up geometric control or reduction of production problems. An alternative stamping configuration (again, due to simple hydrodynamic conditions) is to split the redirector plate into a plurality of stamped components, discrete duct portions 172 shown in FIG. 12, that are then assembled and joined to the sealing plate 130.

Figure 10:
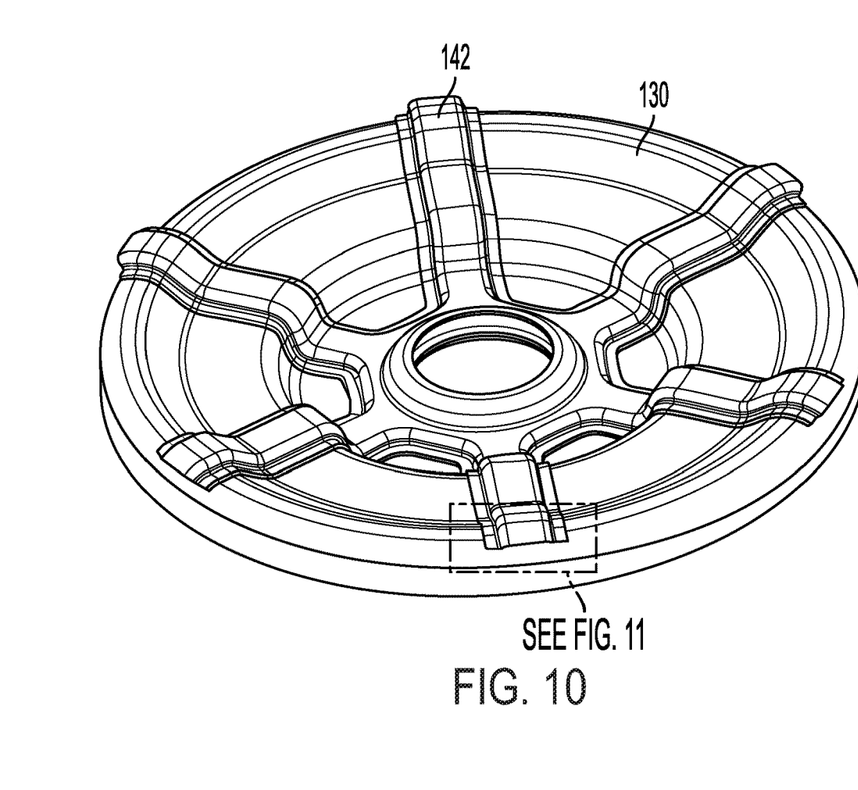
FIG. 10 is a perspective view of an oil redirector and sealing plate in accordance with the present disclosure.
Figure 11:
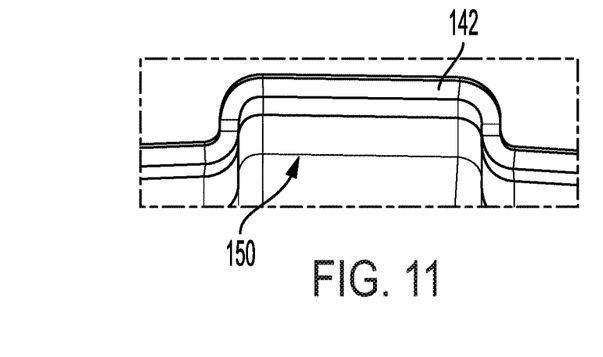
FIG. 11 is an enlarged portion of FIG. 10.
Figure 12:
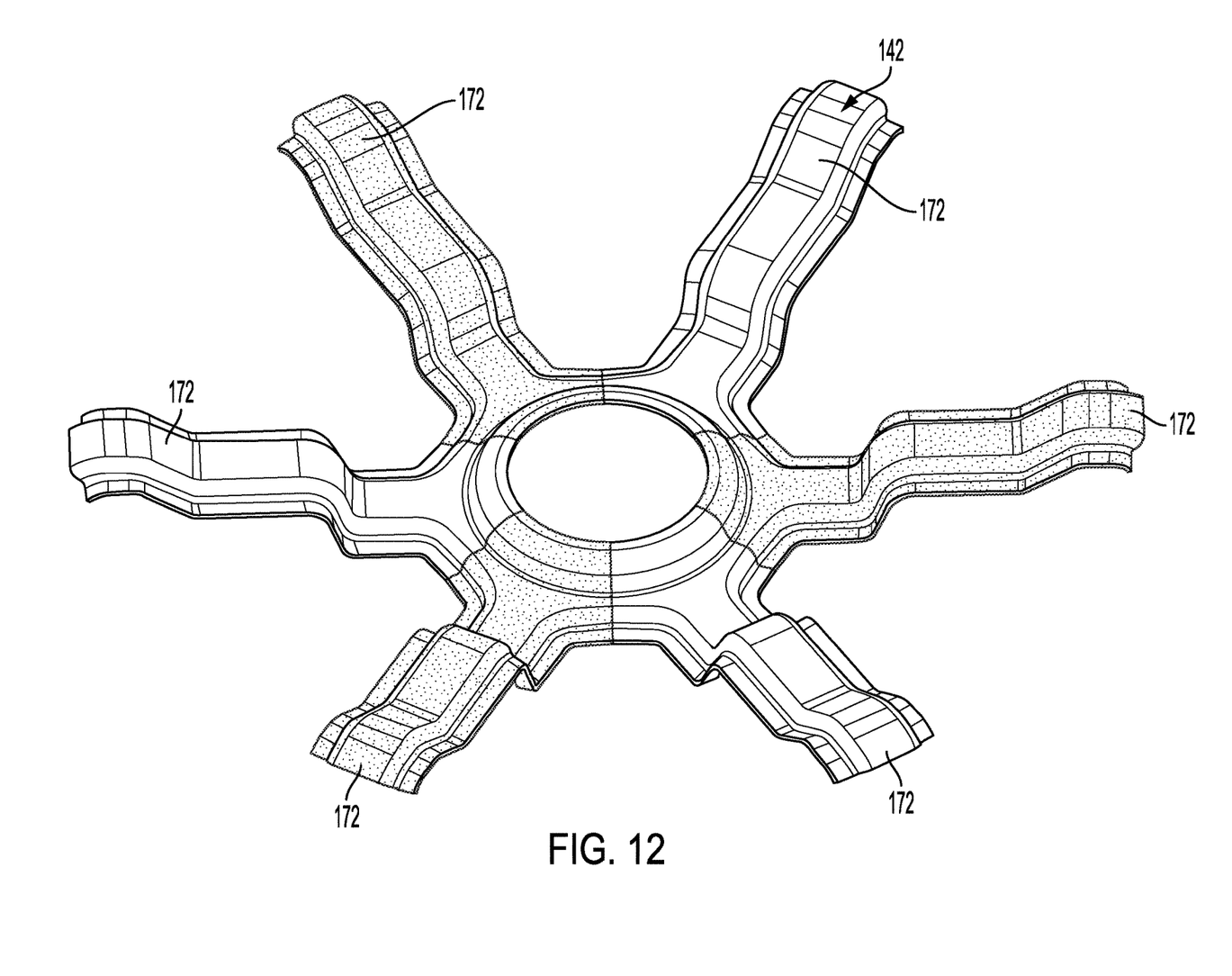
FIG. 12 is a perspective view of an oil redirector made from multiple discrete duct portions.

As best shown in FIGS. 10 and 11, the redirector plate 142 includes a plurality of channels 150 defining a portion of each duct 146. The channels 150 are generally rectangular in cross-section, but can have other cross-sectional shapes such as a trapezoidal shape.

Returning to FIG. 7, a geometric feature of the funnel zone y is shown. More specifically, the redirector plate 142 comprises circumferentially-spaced sidewalls 160 that extend generally tangentially to a center opening 164 between respective ducts 146. The tangential sidewalls 160 are comprised of two sidewall sections 168a and 168a. The sidewall sections each lie in respective non-parallel planes. An angle $\theta$ between the respective planes is greater than zero to promote efficient flow of the transmission fluid.

Figure 13:
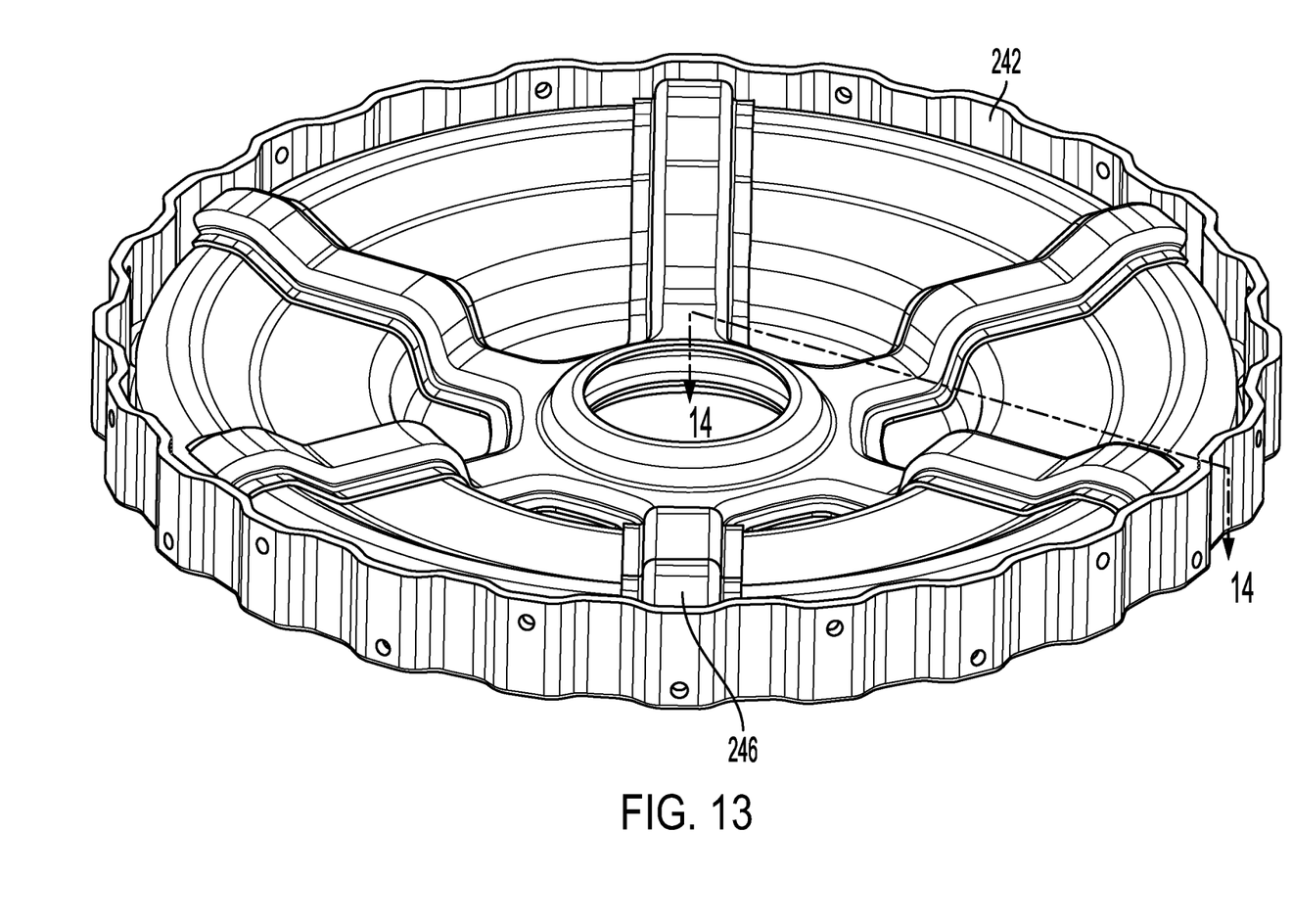
FIG. 13 is another exemplary oil redirector in accordance with the present disclosure.
Figure 14:
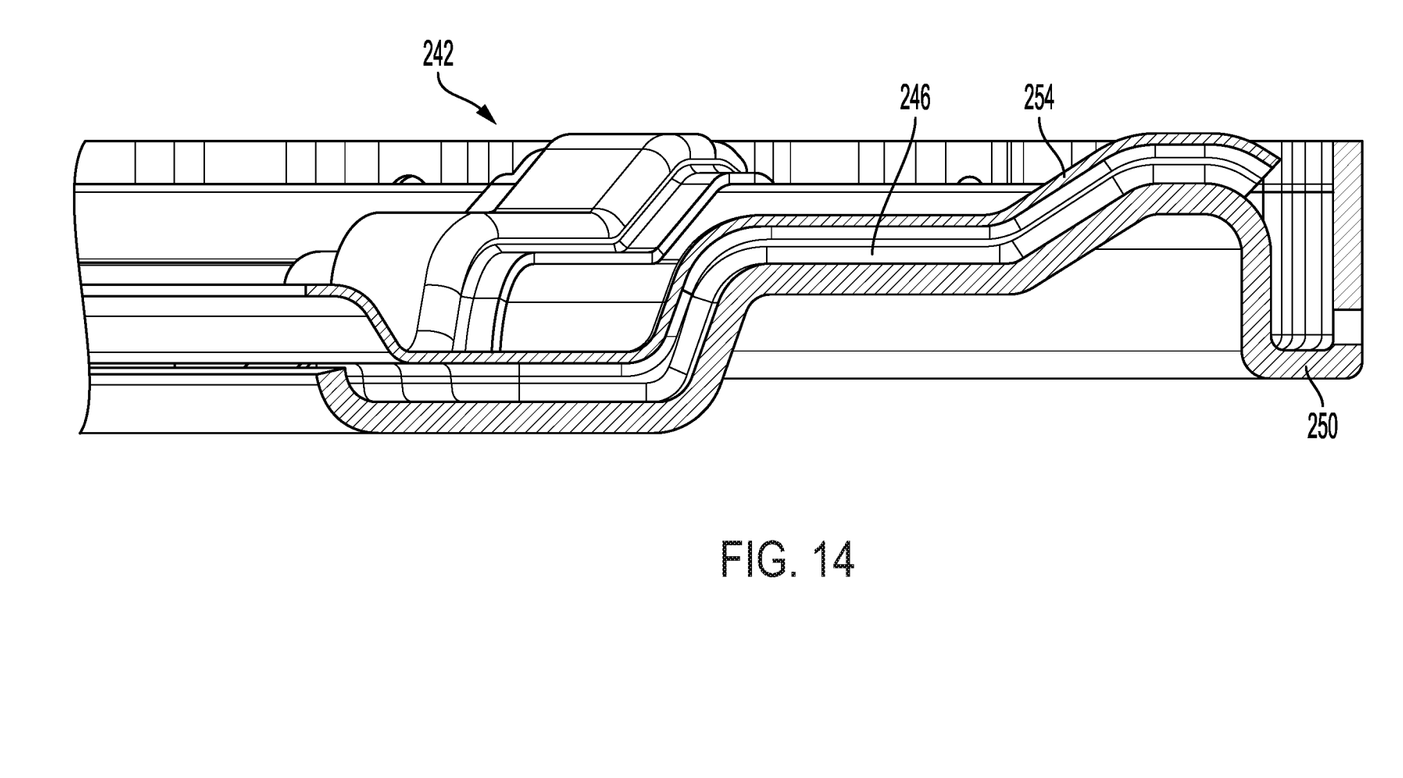
FIG. 14 is a cross-sectional view taken along the line 14-14 in FIG. 13.

With reference to FIGS. 13 and 14, and in accordance with another exemplary embodiment of the present disclosure, an exemplary oil redirector is illustrated and identified generally by reference numeral 242. The oil redirector 242 in this embodiment is an independent component and is not formed in conjunction with a sealing plate. That is, unlike the redirector plate 142, the oil redirector 242 is a stand-alone component that defines a plurality of radially extending ducts 246. To this end, the oil redirector 242 includes a first half 250 and a second half 254. Together, the first half 250 and second half 254 define at least portions of the ducts 246. It will be appreciated that the oil redirector 242 can otherwise include any and all features of the redirector plate 142 and sealing plate 130 described above.

LOG OF REFERENCE NUMERALS 10 clutch assembly
12 shaft
14 outer carrier
18 inner carrier
22 clutch pack
26 piston
30 sealing plate
32 hub
34 inlet
38 outlet
110 clutch assembly
112 shaft 114 outer carrier
118 inner carrier
122 clutch pack
126 piston
130 sealing plate
132 hub
134 inlet
138 outlet
142 redirector plate
146 ducts
150 channels
160 sidewalls
168a sidewall section
168b sidewall section
242 oil redirector
250 first half of oil redirector
254 second half of oil redirector

What is claimed is:

1. A clutch assembly comprising:
an inner carrier;
a clutch pack;
a piston for selectively applying pressure to the clutch pack;
a sealing plate; and
an oil redirector;
wherein the oil redirector and the sealing plate define an entirety of a plurality of circumferentially spaced-apart and radially extending ducts for directing transmission fluid from a radially inner transmission fluid inlet to the clutch pack;
wherein the oil redirector comprises a plurality of circumferentially-spaced sidewalls extending tangentially relative to a center opening of the oil redirector, the sidewalls extending between radially inner ends of respective adjacent pairs of the plurality of ducts; and
wherein each of the sidewalls are comprised of two sidewall sections, each sidewall section extending in a respective non-parallel plane, and an angle θ between the respective planes is greater than zero.

2. The clutch assembly according to claim 1, wherein the oil redirector comprises a plurality of circumferentially spaced-apart channels surrounding the center opening.

3. The clutch assembly according to claim 2, wherein the channels define first surfaces of the plurality of ducts and the sealing plate defines second surfaces of the plurality of ducts, the first surfaces and second surfaces defining flow paths.

4. The clutch assembly according to claim 2, wherein the channels have a rectangular cross-sectional shape.

5. The clutch assembly according to claim 1, wherein the oil redirector is laser welded to the sealing plate.

6. The clutch assembly according to claim 1, wherein the oil redirector comprises a stamped sheet of metal.

7. The clutch assembly according to claim 1, wherein the oil redirector is comprised of a plurality of discrete components secured to the sealing plate, each discrete component defining at least a portion of at least one duct of the plurality of ducts.

8. The clutch assembly according to claim 1, wherein the clutch pack is a semi-dry clutch pack.

9. An oil redirector for a clutch assembly comprising:
a first redirector half; and
a second redirector half joined to the first redirector half;
wherein the first redirector half and the second redirector half define an entirety of a plurality of circumferentially spaced-apart and radially extending ducts for directing transmission fluid from a radially inner transmission fluid inlet to a radially outer region of the clutch assembly;
wherein at least one of the first redirector half or second redirector half comprises a plurality of circumferentially-spaced sidewalls extending tangentially relative to a center opening of the oil redirector, the sidewalls extending between radially inner ends of respective adjacent pairs of the plurality of ducts; and
wherein each of the sidewalls are comprised of two sidewall sections, each sidewall section extending in a respective non-parallel plane, and an angle θ between the respective planes is greater than zero; and
wherein an annular recollection zone is defined by axially facing surfaces of the first and second redirector halves.

10. The oil redirector according to claim 9, wherein at least one of the first redirector half or second redirector half includes a plurality of circumferentially spaced-apart channels surrounding the center opening.

11. The oil redirector according to claim 10, wherein the channels have a rectangular cross-sectional shape.

12. The oil redirector according to claim 9, wherein the first redirector half is laser welded to the second redirector half.

13. The oil redirector according to claim 9, wherein at least one of the first redirector half or second redirector half comprises a stamped sheet of metal.

14. A method of supplying non-pressurized transmission fluid to a semi-dry clutch pack of a clutch assembly comprising:
forming a plurality of circumferentially spaced-apart and radially extending ducts for directing the transmission fluid from a radially inner transmission fluid inlet to the clutch pack;
wherein forming the plurality of ducts includes securing an oil redirector to a sealing plate of the clutch assembly;
wherein the oil redirector comprises a plurality of circumferentially-spaced sidewalls extending tangentially relative to a center opening of the oil redirector, the sidewalls extending between radially inner ends of respective adjacent pairs of the plurality of ducts; and
wherein each of the sidewalls are comprised of two sidewall sections, each sidewall section extending in a respective non-parallel plane, and an angle θ between the respective planes is greater than zero; and
wherein the oil redirector and the sealing plate define an entirety of the plurality of circumferentially spaced-apart and radially extending ducts.

15. The method according to claim 14, wherein securing the oil redirector to the sealing plate includes laser welding the oil redirector to the sealing plate.

16. The method according to claim 14, wherein the oil redirector comprises a stamped sheet of metal.

* * * * *